United States Patent [19]
Banks et al.

[11] Patent Number: 5,195,376
[45] Date of Patent: Mar. 23, 1993

[54] FLUID PRESSURE DIFFERENTIAL MONITOR

[75] Inventors: Anthony J. Banks, Northwood; Dennis S. Poulter, London, both of England

[73] Assignee: BICC plc, London, England

[21] Appl. No.: 793,019

[22] Filed: Nov. 15, 1991

[30] Foreign Application Priority Data

Nov. 15, 1990 [GB] United Kingdom ............... 9024847

[51] Int. Cl.⁵ .................. G01L 7/16; G01L 13/02
[52] U.S. Cl. ........................... 73/744; 73/700; 73/756; 116/268
[58] Field of Search .......... 73/744, 756, 146.8, 73/700, 716; 116/268

[56] References Cited

U.S. PATENT DOCUMENTS

| | | | |
|---|---|---|---|
| 3,126,739 | 3/1964 | White Hill | 116/268 |
| 4,583,484 | 4/1986 | Freund | 116/268 |

*Primary Examiner*—Donald O. Woodiel
*Attorney, Agent, or Firm*—Oliff & Berridge

[57] ABSTRACT

A device for continuously monitoring the difference in pressure of fluid in two closed spaces and separated by a dividing wall comprises an open-ended tubular housing which is secured to a rigid tube passing through and rotatably mounted in a horizontal passage in the wall with their axes inclined at an angle to one another. By rotably adjusting the housing with respect to the wall, the housing can be arranged to lie at a desired angle to the horizontal. The housing has a length three times its internal diameter and is transparent in end parts and opaque in a central part, each part being equal to a third of the total length of the housing. Two balls, each of a diameter slightly less than the internal diameter of the housing, are retained and free to roll within the housing, the ball remote from the wall being green and the other red. When fluid in the closed space into which the inclined housing protrudes is at a pressure a desired value below the pressure of fluid in the other closed space, the green ball will be urged by fluid pressure into the higher transparent end part of the housing and the red ball will be urged into the opaque central part of the housing, thereby giving a readily recognizable indication of the acceptable state of the fluid pressure differential.

13 Claims, 2 Drawing Sheets

FLUID PRESSURE DIFFERENTIAL MONITOR

In many types of buildings, it is desirable or necessary to control the pressure of air or other fluid in a room or other closed space at a predetermined or colerable value so that between adjacent rooms or adjacent closed spaces a fluid pressure differential is maintained or exists that is within an acceptable predetermined limited range. The maintenance and control of a predetermined air or other fluid pressure differential between adjacent rooms or adjacent closed spaces may be necessary or desirable to prevent the migration of contaminants from one room or closed space to an adjacent room or closed space.

Whilst many devices for controlling, regulating and/or monitoring the fluid pressure differential between adjacent rooms or other adjacent closed spaces have been proposed and are currently available, in most instances they are over sophisticated and consequently expensive and/or do not provide a simple visual indication to a building operator that a desired fluid pressure differential between adjacent rooms or other adjacent closed spaces is being maintained.

It is an object of the present invention to provide a simple and inexpensive device for continuously monitoring the difference in pressure of air or other fluid in two adjacent closed spaces separated by a dividing wall or other substantially fluid-impermeable barrier separating the closed spaces, all such barriers for convenience hereinafter being included in the expression "dividing wall", which improved device will give a continuous visual indication that the monitored fluid pressure differential is or is not of at least a predetermined value.

According to the invention, the improved fluid pressure differential monitoring device comprises an open ended tubular housing which has a length that is at least twice the internal diameter of the housing, which over a part of its length is of transparent material and over the remaining part of its length is opaque and in which is retained and free to roll at least one spherical body of a diameter slightly less than the internal diameter of the housing, the tubular housing being adapted to be so removably mounted on a face of said dividing wall as to effect a substantially fluid-seal with an end of a passage in the wall interconnecting said closed spaces and as to extend outwardly from said face of the wall with the longitudinal axis of the tubular housing lying at an angle to the horizontal, the angle of inclination of the tubular housing and the weight of the or each spherical body being so selected having regard to a desired fluid pressure differential between the pressures of the fluid in said closed spaces and the relative lengths of the transparent and opaque parts of the tubular housing being such that, when the fluid pressure differential the pressures of the fluid in said closed spaces is at least of said desired value the spherical body will be urged by said fluid pressure differential to the higher end of the tubular housing, when the spherical body will be either wholly visible or wholly invisible, and when said fluid pressure differential falls below said desired value the spherical body will roll down the tubular housing under the influence of gravity until it reaches the lower end of the tubular housing, when the spherical body will be either wholly invisible or wholly visible.

Preferably, the tubular housing is adapted to be so mounted on a face of said dividing wall that at least a part of the length of the tubular housing immediately adjacent the higher end of the tubular housing is of transparent material so that the spherical body will be wholly visible when the fluid pressure differential between the pressures of the fluid in said closed spaces is at least of said desired value. In this case, the spherical body is preferably of a colour which gives a readily recognised indication of the state of the fluid pressure differential, e.g. green.

Preferably, also, the tubular housing is adapted to be so mounted on a face of said dividing wall that the tubular housing is rotatable with respect to the wall about a substantially horizontal axis passing through the centre of the end of the tubular housing nearer the wall so that, by appropriate rotation of the tubular housing with respect to the wall, the angle of inclination of the tubular housing can be adjusted to any angle lying within a limited range; in a preferred embodiment, the tubular housing can be rotated with respect to the wall through 360° so that, for one half of a revolution of the tubular housing, the angle of inclination can be adjusted to any positive angle lying within a limited range so that the improved device will cope with a positive fluid pressure differential between the pressures of the fluid in two adjacent closed spaces and, for the other half of a revolution of the tubular housing, the angle of inclination of the tubular housing can be adjusted to any negative angle lying within a limited range so that the improved device will cope with a negative fluid pressure differential between the pressures of the fluid in two adjacent closed spaces. When the tubular housing is so rotatably mounted, preferably the tubular housing carries a datum mark and said face of the wall carries a fixed scale of fluid pressure differential having regard to the weight of the or each spherical body and possible positive and negative angles of inclination of the tubular housing. In this case, the datum mark may be carried on the periphery of an annular disc rigidly secured to the end of the tubular housing that will be nearer the wall and the fixed scale may be carried on one face of a substantially flat plate which has a centrally disposed hole and which can be secured to said face of the wall with the hole in the plate in substantially axial alignment with the passage through the wall.

It will be appreciated that the tubular housing will be at its maximum positive or negative angle to the horizontal when the axis of the tubular housing lies in a vertical plane containing the axis of the passage through the dividing wall. This maximum positive or negative angle can be any angle up to and including 90°, the particular maximum angle selected being dependant upon the desired fluid pressure differential and the weight of the spherical body or bodies. Thus, for one quarter of a revolution of the tubular housing, the angle of inclination of the tubular housing to the horizontal can be arranged to be any angle lying between said maximum positive or negative angle and zero, when the axis of the tubular housing will lie in a horizontal plane.

To facilitate mounting of the tubular housing on said face of the dividing wall in such a way that the tubular housing is rotatable is hereinbefore described with respect to the wall, preferably the end of the tubular housing that will be nearer said face of the wall is integral with or secured to a substantially rigid straight open ended tube in such a way that the axis of the tubular housing is inclined at a fixed angle to the axis of the tube. In this case, the rigid tube will be of such a length that it can be removably disposed in and will protrude from one end of a substantially straight horizontal passage extending through said dividing wall, the device being retained in place so that it is rotatable with respect to the wall about the axis of the rigid tube by any convenient means mounted on the protruding end of the tube and bearing against the opposite face of said dividing wall. Suitable retaining means include a spring-loaded backplate and at least one nut screwed on to an external screw thread at the protruding end of the tube. The rigid tube, and hence the device of which the tube forms a part, can be readily removed from the dividing wall for cleaning purposes by disengagement of the retaining means and withdrawal of the tube from the passage.

At the end of the tubular housing that will be remote from said dividing wall, the or each spherical body may be retained in the tubular housing by any convenient means, e.g. by at least one removable pin which extends diametrically across the tubular housing immediately adjacent said open end of the housing or by a perforated end cap. At the end of the tubular housing that will be nearer said dividing wall, the or each spherical body may be retained in the tubular housing by any convenient means, e.g. by a stop protruding radially into the bore of the tubular housing, by a part of the annular disc bounding the central hole therein or by a part of said face of the dividing wall bounding the adjacent open end of the passage through said wall.

In one preferred embodiment of the invention, the tubular housing has a length that is at least three times the internal diameter of the housing, over at least a third of its length at each end of the housing is of transparent material and over at least a third of its length centrally disposed between its ends is opaque, and two spherical bodies, each of a diameter slightly less than the internal diameter of the tubular housing, are retained and free to roll within the tubular housing, one spherical body being of a colour different to and readily distinguishable from that of the other. For example, where this preferred embodiment of the improved device is to be installed on that face of a dividing wall in the closed space which is at the lower fluid pressure with the higher end of the tubular housing remote from the wall, the spherical body that will be remote from the dividing wall may be green and the spherical body that will be nearer the dividing wall may be red so that, when the fluid pressure differential between the pressures of the fluid in the closed spaces separated by the dividing wall is at least of the desired predetermined value, the red spherical body nearer the dividing wall will be in the opaque part of the tube and thereby invisible and the spherical body remote from the dividing wall will be visible at the transparent end of the tubular housing remote from the wall and, by virtue of its green colour, will give a readily recognised indication of the state of the fluid pressure differential and, when the fluid pressure differential between the pressures of the fluid in said closed spaces falls below said desired predetermined value, the green spherical body remote from the dividing wall will be in the opaque part of the tubular housing and thereby invisible and the spherical body nearer the wall will be visible at the transparent end of the tubular housing immediately adjacent the wall and, by virtue of its red colour, will give a readily recognised indication of the unacceptable state of the fluid pressure differential.

In a second preferred embodiment of the invention, the tubular housing has a length that is at least three times the internal diameter of the housing, over at least a third of its length at each end of the housing is opaque and over at least a third of its length centrally disposed between its ends is of transparent material, and two spherical bodies, each of a diameter slightly less than the internal diameter of the tubular housing, are retained and free to roll in the tubular housing, one spherical body being of a colour different to and readily distinguishable from that of the other. For example, where the second preferred embodiment of the improved device is to be installed on that face of a dividing wall in the closed space which is at the higher fluid pressure with the lower end of the tubular housing remote from the wall, the spherical body that will be remote from the dividing wall may be green and the spherical body that will be nearer the dividing wall may be red so that, when the fluid pressure differential between the pressures of the fluid in the closed spaces separated by the dividing wall is at least of the desired predetermined value, the red spherical body nearer the dividing wall will be in the opaque end part of the tube nearer the wall and thereby invisible and the spherical body remote from the dividing wall will be visible at the transparent central part of the tubular housing and, by virtue of its green colour, will give a readily recognised indication of the state of the fluid-pressure differential and, when the fluid-pressure differential between the pressures of the fluid in said closed spaces falls below said desired predetermined value, the green spherical body will be in the opaque end part of the tubular housing remote from the wall and thereby invisible and the spherical body nearer the wall will be visible at the transparent central part of the tubular housing and, by virtue of its red colour, will give a readily recognised indication of the unacceptable state of the fluid-pressure differential.

It will be appreciated that the range of values of fluid pressure differentials that the improved device can monitor may be extended by replacing the or each spherical body with a spherical body of the same dimensions but of greater or less weight. In this case, the fixed scale will also have to be changed.

The improved device is especially, but not exclusively, suitable for continuously monitoring low pressure differentials, e.g. pressure differentials lying in the range 5 to 15 pascals.

The invention is further illustrated by a description, by way of example, of a preferred fluid pressure differential monitoring device mounted on one surface of a dividing wall separating two closed spaces containing air under pressures differing from one another by a desired predetermined value, with reference to the accompanying drawings, in which.

Figure 1:
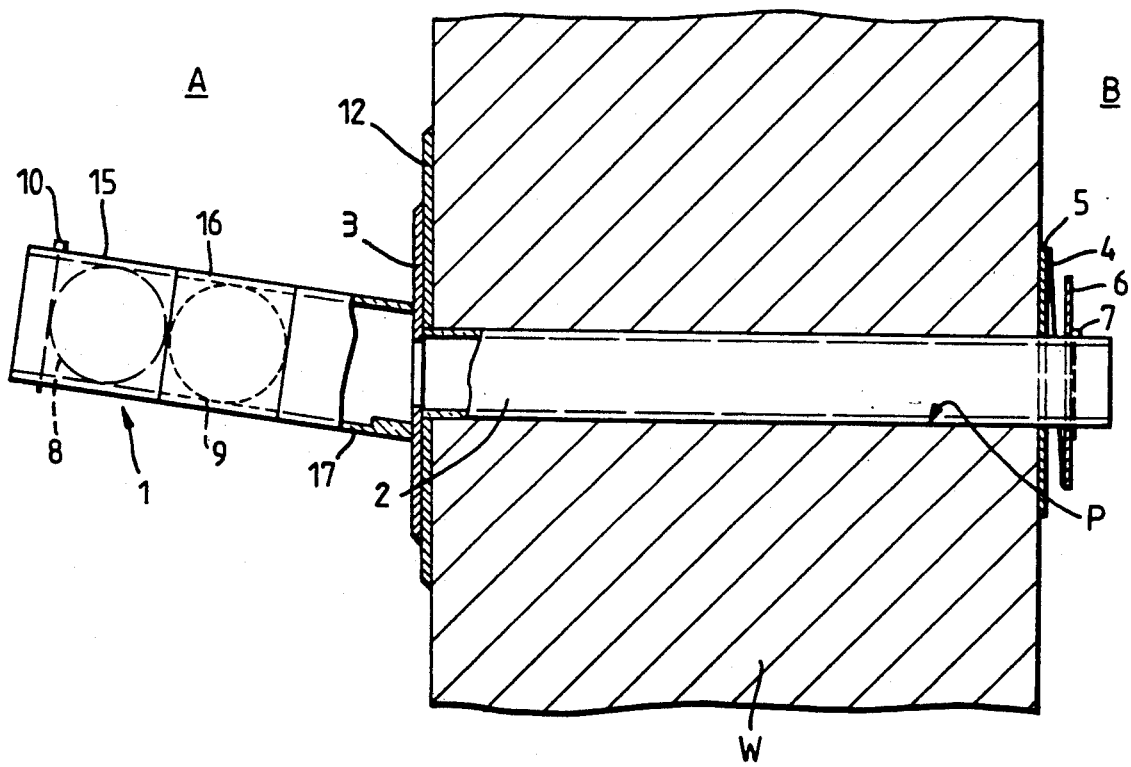
FIG. 1 is a sectional side view of the preferred fluid pressure differential monitoring device with the air pressure in the closed space in which the monitoring device protrudes at or above said desired predetermined value.
Figure 2:
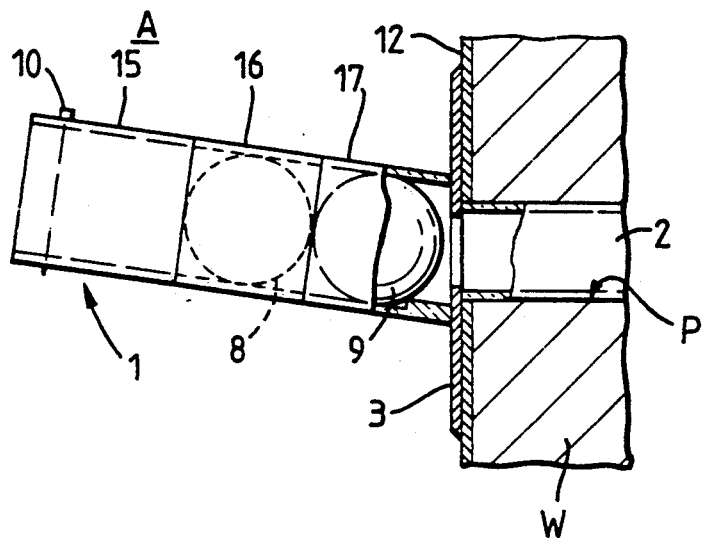
FIG. 2 is a fragmental sectional side view of the preferred fluid pressure differential monitoring device with the air pressure in the closed space in which the monitoring device protrudes substantially below said desired predetermined value.
Figure 3:
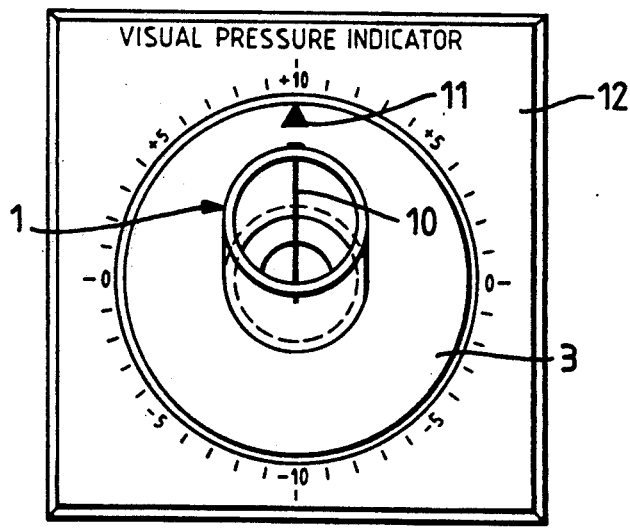
FIG. 3 is a front end view of the monitoring device shown in FIG. 1.

Referring to the drawings, the preferred fluid pressure differential monitoring device comprises an open ended tubular housing 1 which at one of its ends is secured to a rigid straight open ended tube 2 via a interposed annular disc 3 in such a way that the axis of the tubular housing is inclined at a fixed angle, say 10°, to the axis of the tube. The tube 2 is removably disposed in and protrudes from an end of a straight horizontal passage P extending through a dividing wall W separating two adjacent closed spaces A and B each containing air under pressure. The monitoring device is retained in place with the tubular housing 1 disposed in the closed space A and the tube 2 protruding into the closed space B by a coil spring 4 which is constrained between a backplate 5 bearing against the face of the dividing wall W in the closed space B and a pressure plate 6 by a retaining pin 7, the device being rotatable with respect to the wall about the axis of the tube.

The tubular housing 1 has a length slightly greater than three times its internal diameter and two spherical balls 8, 9, each of a diameter slightly less than the internal diameter of the tubular housing, are free to roll within the tubular housing, the balls being retained in the bore of the housing by a retaining pin 10 at the end of the housing remote from the dividing wall W and the radially inner part of the anular disc 3 which protrudes partially into the bore of the housing. Over an end part 15 of the length of the tubular housing 1 remote from the dividing wall W and over an end part 17 of the length nearer the dividing wall, each of which end parts has a length approximating to a third of the total length on the tubular housing, the wall of the tubular housing is of transparent material and over a central part 16 of the length of the tubular housing disposed between the end parts, which central part also has a length approximating to a third of the total length of the housing, the wall of the housing is opaque. The ball 8 remote from the dividing wall W is coloured green; the ball 9 is coloured red.

The monitoring device can be rotated with respect to the dividing wall W through 360° so that, for one half of a revolution of the tubular housing 1, the angle of inclination of the tubular housing to the horizontal can be adjusted to any positive angle lying within a limited range and, for the other half of the revolution of the tubular housing, the angle of inclination of the housing to the horizontal can be adjusted to any negative angle lying within a limited range. The annular disc 3, fixedly interconnecting the tubular housing 1 and the rigid tube 2, carries a datum mark 11 which, when the axis of the tubular housing lies in a vertical plane containing the axis of the tube 2 extending through the passage P in the dividing wall W and the tubular housing 1 is inclined at its maximum positive angle to the horizontal, will lie in the same vertical plane as the twelve o'clock position. Fixedly secured to the face of the dividing wall W in the closed space A and underlying the disc 3 is a plate 12 which has a centrally disposed hole in axial alignment with the passage P and which carries on its surface a fixed scale 14 of fluid pressure differentials having regard to the weight of each of the balls 8 and 9 and possible positive and negative angles of inclination of the tubular housing 1. When air in the closed space A is to be maintained at a pressure lower than that of the air in the closed space B by a desired predetermined pressure differential, the monitoring device is rotatably adjusted with respect to the dividing wall W so that the axis of the tubular housing 1 is inclined to the horizontal at a desired positive angle determined by the weight of each of the balls 8 and 9. When the air pressure differential between the pressures of air in the closed spaces A and B is equal to or greater than the aforesaid predetermined value, the ball 8 remote from the dividing wall W will be urged by air pressure into the higher transparent end part 15 of the tubular housing 1 and, by virtue of its green colour, will give a readily recognised indication of the acceptable state of the air pressure differential between the two closed spaces A and B and the red ball 9 nearer the dividing wall W will be urged into the opaque central part 16 of the tubular housing and thereby will be invisible. In the event that the air pressure differential between the pressures of air in the closed spaces A and B should fall below the desired predetermined value, the two balls 8 and 9 will roll down the tubular housing 1 under gravity so that the ball 9 nearer the dividing wall W will be visible at the lower transparent end part 17 of the tubular housing and, by virtue of its red colour will give a readily recognised indication of the unacceptable state of the air pressure differential between the two closed spaces and the green ball 8 remote from the dividing wall W will be in the opaque central part 16 of the tubular housing and thereby will be invisible.

What we claim as our invention is:

1. A device for continuously monitoring the difference in pressure of fluid in two adjacent closed spaces separated by a dividing wall, which device comprises an open ended tubular housing which has a length which is at least twice the internal diameter of the housing, which over a part of its length is of a transparent material and over the remaining part of its length is opaque and in which is retained and free to roll at least one spherical body of a diameter slightly less than the internal diameter of the housing, the tubular housing being adapted to be so removably mounted on a face of said dividing wall as to effect a substantially fluid-tight seal with an end of a passage in the wall interconnecting said closed spaces and as to extend inwardly from said face of the wall with the longitudinal axis of the tubular housing lying at an angle to the horizontal, the angle of inclination of the tubular housing and the weight of the spherical body, being so selected having regard to a desired value of fluid pressure differential between the pressures of the fluid in said closed spaces and the relative lengths of the transparent and opaque parts of the tubular housing being such that, when the fluid pressure differential between the pressures of the fluid in said closed spaces is at least of said desired value the spherical body will be urged by said fluid pressure differential to the higher end of the tubular housing, when the spherical body will be either wholly visible or wholly invisible, and when said fluid pressure differential falls below said desired value the spherical body will roll down the tubular housing under the influence of gravity until it reaches the lower end of the tubular housing, when the spherical body will be either wholly invisible or wholly visible.

2. A fluid pressure differential monitoring device as claimed in claim 1, wherein the tubular housing is adapted to be so mounted on a face of said dividing wall that at least a part of the length of the tubular housing immediately adjacent the higher end of the tubular housing is of transparent material so that the spherical body will be wholly visible when the fluid pressure differential between the pressures of the fluid in said closed spaces is at least of said desired value.

3. A fluid pressure differential monitoring device as claimed in claim 2, wherein the spherical body is of a colour which gives a readily recognised indication of the state of the fluid pressure differential.

4. A fluid pressure differential monitoring device as claimed in claim 1, wherein the tubular housing is adapted to be so mounted on a face of said dividing wall that the tubular housing is rotatable with respect to the wall about a substantially horizontal axis passing through the centre of the end of the tubular housing nearer the wall so that, by appropriate rotation of the tubular housing with respect to the wall, the angle of inclination of the tubular housing can be adjusted to any angle lying within a limited range.

5. A fluid pressure differential monitoring device as claimed in claim 4, wherein the tubular housing can be rotated with respect to the wall through 360° so that, for one half of a revolution of the tubular housing, the angle of inclination can be adjusted to any positive angle lying within the limited range so that the device will cope with a positive fluid pressure differential between the pressures of the fluid in said adjacent closed spaces and, for the other half of a revolution of the tubular housing, the angle of inclination of the tubular housing can be adjusted to any negative angle lying within the limited range so that the device will cope with a negative fluid pressure differential between the pressures of the fluid in said adjacent closed spaces.

6. A fluid pressure differential monitoring device as claimed in claim 4, wherein the tubular housing carries a datum mark and a separately formed fixed scale of fluid pressure differential having regard to the weight of the spherical body and possible positive and negative angles of inclination of the tubular housing is adapted to be secured to said face of the wall.

7. A fluid pressure differential monitoring device as claimed in claim 6, wherein the datum mark is carried on the periphery of an annular disc which is secured to the end of the tubular housing that will be nearer the wall and the fixed scale is carried on one face of a substantially flat plate which has a centrally disposed hole and which can be secured to said face of the wall with the hole in the plate in substantially axial alignment with the passage through the wall.

8. A fluid pressure differential monitoring device as claimed in claim 4, wherein the end of the tubular housing that will be nearer said face of the wall is secured to a substantially rigid straight open-ended tube in such a way that the axis of the tubular housing is inclined at a fixed angle to the axis of the tube, the rigid tube being of such a length that it can be removably disposed in and will protrude from one end of a substantially straight horizontal passage extending through said dividing wall and the device being retainable in place so that it is rotatable with respect to the wall about the axis of the rigid tube by means mounted on the protruding end of the tube and bearing against the opposite face of said dividing wall.

9. A fluid pressure differential monitoring device as claimed in claim 8, wherein said retaining means includes a spring-loaded backplate and at least one nut screwed on to an external screwthread at the protruding end of the rigid tube.

10. A fluid pressure differential monitoring device as claimed in claim 1, wherein at the end of the tubular housing that will be remote from said dividing wall, the spherical body is retained in the tubular housing by at least one removable pin which extends diametrically across the tubular housing immediately adjacent said open end of the housing.

11. A fluid pressure differential monitoring device as claimed in claim 1, wherein at the end of the tubular housing that will be nearer said dividing wall, the spherical body is retained in the tubular housing by a stop protruding radially into the bore of the tubular housing.

12. A fluid pressure differential monitoring device as claimed in claim 1, wherein the tubular housing has a length that is at least three times the internal diameter of the housing, over at least a third of its length at each end of the housing is of transparent material and over at least a third of its length centrally disposed between its ends is opaque, and two spherical bodies, each of a diameter slightly less than the internal diameter of the tubular housing, are retained and free to roll within the tubular housing, one spherical body being of a colour different to and readily distinguishable from that of the other.

13. A fluid pressure differential monitoring device as claimed in claim 1, wherein the tubular housing has a length that is at least three times the internal diameter of the housing, over at least a third of its length at each end of the housing is opaque and over at least a third of its length centrally disposed between its ends is of transparent material, and two spherical bodies, each of a diameter slightly less than the internal diameter of the tubular housing, are retained and free to roll in the tubular housing, one spherical body being of a colour different to and readily distinguishable from that of the other.

* * * * *